INVENTOR.
Robert R. Crookston,
BY
ATTORNEY.

INVENTOR.
Robert R. Crookston,
BY
ATTORNEY.

INVENTOR.
Robert R. Crookston,
BY
ATTORNEY.

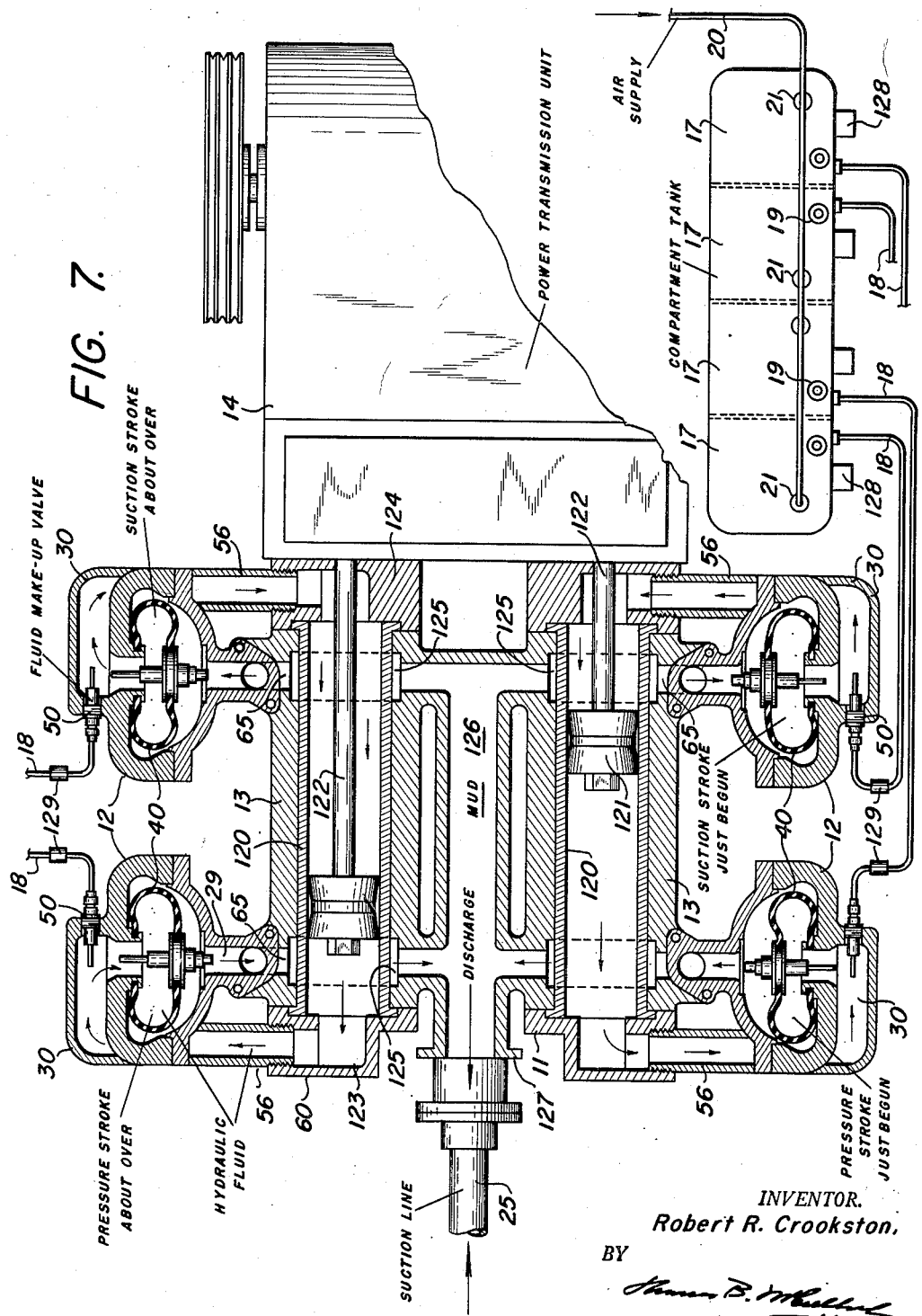

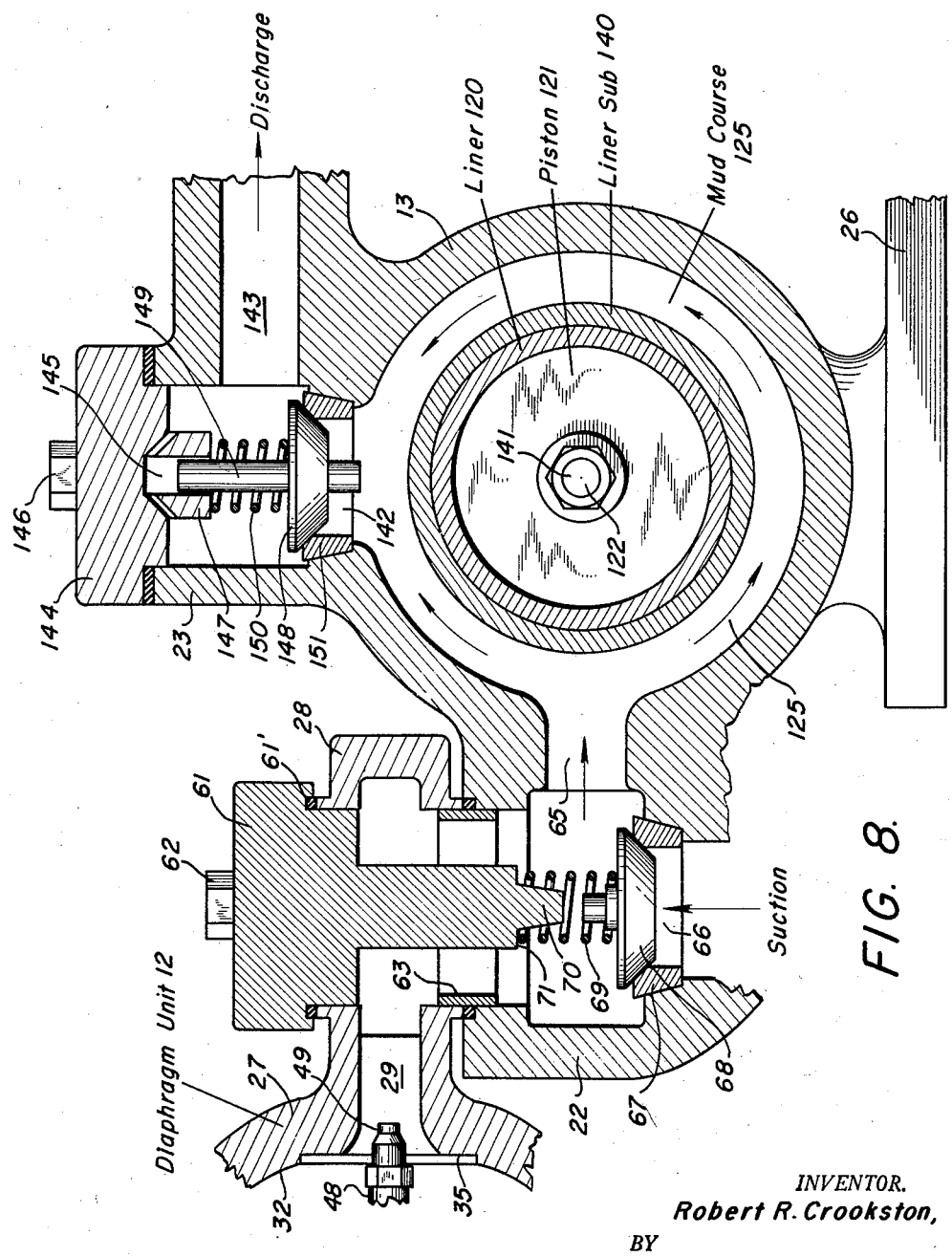

Nov. 5, 1957   R. R. CROOKSTON   2,811,925
DEVICE FOR TRANSMITTING PRESSURE AND PUMPING FLUIDS
Filed Feb. 24, 1954   10 Sheets-Sheet 6
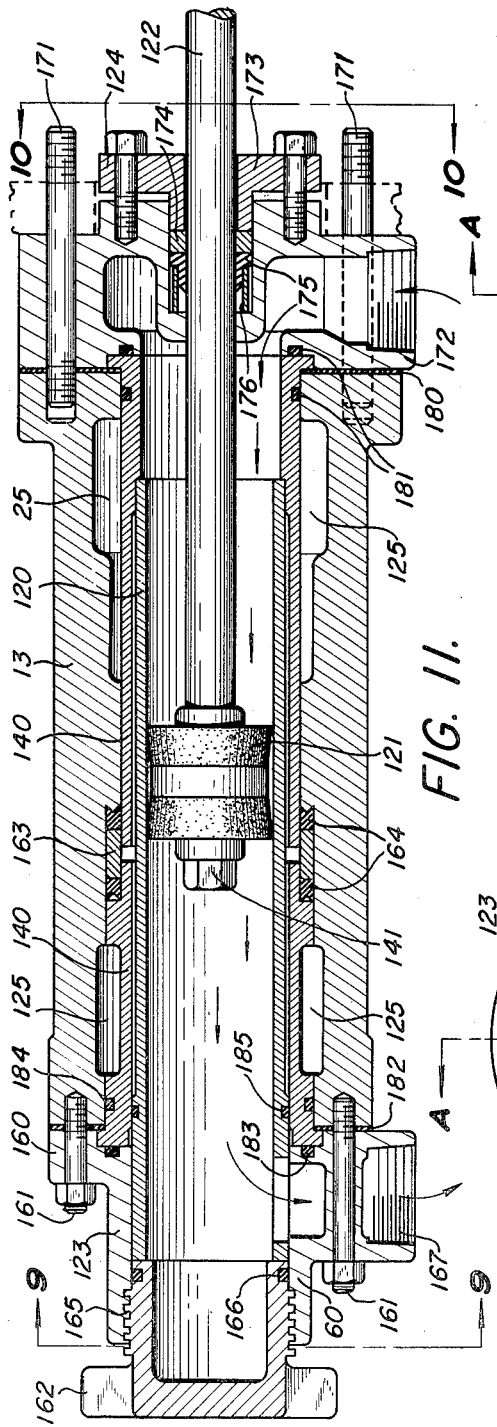
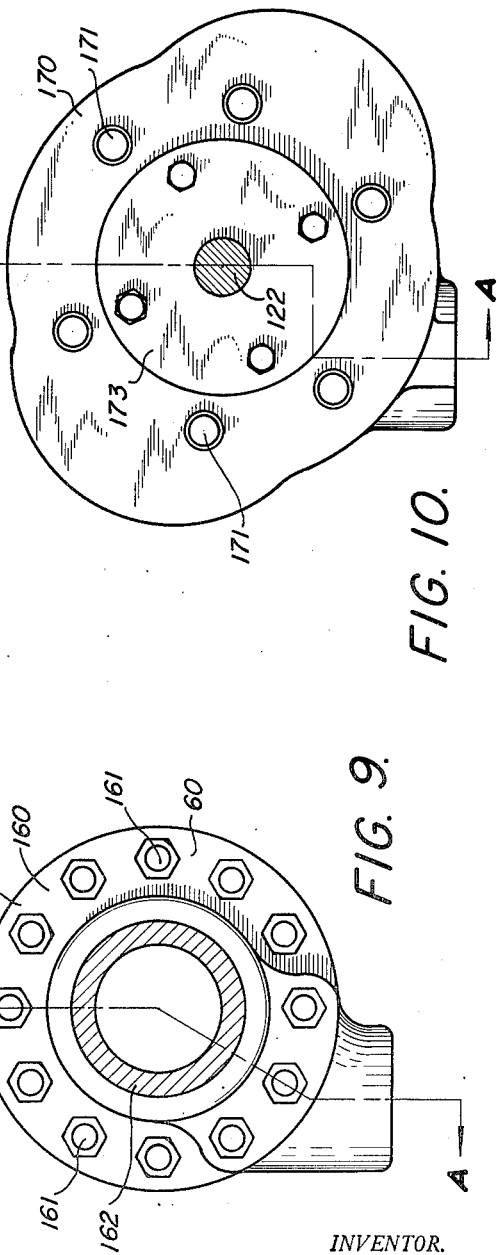
INVENTOR.
Robert R. Crookston,
BY
ATTORNEY.

INVENTOR.
Robert R. Crookston,
BY
ATTORNEY.

INVENTOR.
Robert R. Crookston,
BY
ATTORNEY.

United States Patent Office 2,811,925
Patented Nov. 5, 1957

2,811,925

DEVICE FOR TRANSMITTING PRESSURE AND PUMPING FLUIDS

Robert R. Crookston, Houston, Tex., assignor, by mesne assignments, to Esso Research and Engineering Company, Elizabeth, N. J., a corporation of Delaware Application February 24, 1954, Serial No. 412,341

16 Claims. (Cl. 103—44)

The present invention is directed to a device for transmitting fluid pressure. More particularly, the invention is directed to apparatus for moving abrasive fluids. In its more specific aspects, the invention is directed to apparatus for pumping abrasive fluids, such as drilling mud.

The present invention may be briefly described as involving apparatus for transmitting fluid pressure which comprises a housing provided with two fluid passageways. An internally reinforced diaphragm is arranged in the housing between these passageways. The housing has an inner flat surface for supporting the diaphragm when collapsed and the diaphragm is provided with a rigid supporting member for maintaining the shape of the diaphragm when flexed.

The invention also contemplates apparatus for transmitting fluid pressure which includes a housing provided with two fluid passageways having an internally reinforced diaphragm arranged in the housing between these passageways separating the interior of the housing into first and second chambers. Mounted on the housing is an injection valve means communicating with the first chamber for injecting hydraulic fluid into the first chamber. Means are connected to the diaphragm for opening the injection valve means on movement of the diaphragm beyond a fixed point in the first chamber. The injection valve means has means connected thereto for supplying hydraulic fluid under pressure. This means may suitably include a conduit connected to the injection valve means and to a source of hydraulic fluid; for example, a tank under air pressure or a tank under atmospheric pressure with the conduits provided with a small injection pump may be used. The second chamber is provided with a release valve connected to the diaphragm such that hydraulic fluid is released from the first chamber to the second chamber on movement of the diaphragm past a fixed point in the second chamber i. e. when the fluid pressure in the first chamber exceeds a predetermined amount.

The invention comprises a device for transmitting fluid pressure in which a housing defines a compartment having a first passageway and a second passageway. A reinforced diaphragm which may be of tire shape is arranged in the compartment between the first and second passageways and serves to divide the compartment into a first and second chamber. A fluid piston is arranged in the first chamber and means are provided for controlling the volume of the fluid piston. The compartment has a configuration generally following the configuration of the diaphragm such that the diaphragm is essentially confined in the compartment on movement of the fluid piston in and out of the first chamber. The fluid piston may accumulate heat on movement in and out of the first chamber and, therefore, means are provided for dissipating the heat. Means are also provided for introducing fluid into and withdrawing fluid from the second chamber on movement of the diaphragm.

The invention will be further illustrated by reference to the drawing in which

Fig. 7 is a sectional view through the diaphragm unit and the piston cylinders of Fig. 1;

Fig. 8 is a front sectional view of the piston and valve of Fig. 1;

Fig. 9 is a partial sectional view of the piston cylinder of Fig. 1;

Fig. 10 is an end view of the piston rod end of the piston cylinder;

Fig. 11 is a sectional view through the lines A—A of Figs. 9 and 10;

Fig. 16 is a sectional view taken along the lines 16—16 of Fig. 15;

Figure 1:
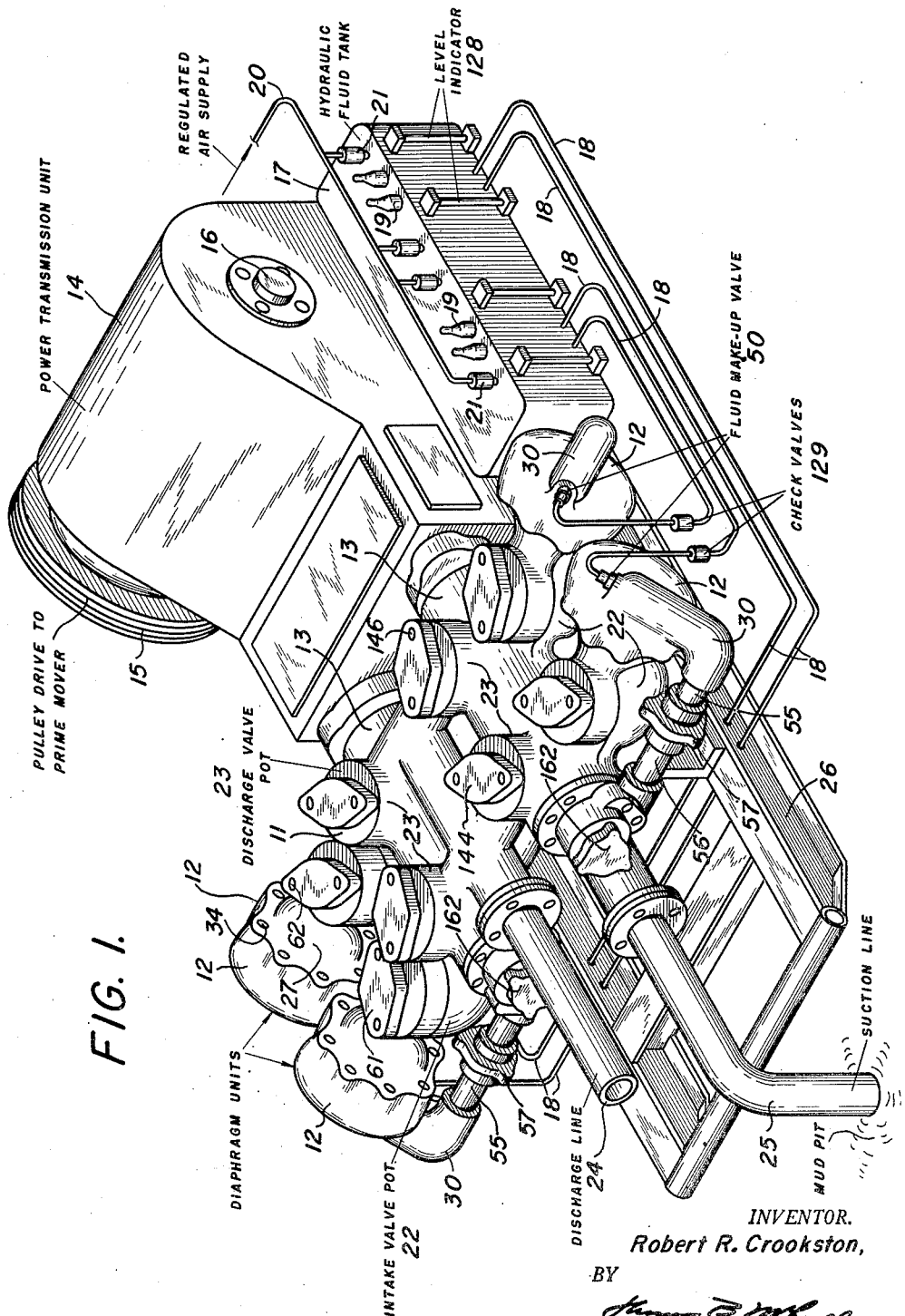
Fig. 1 is a view of a pump embodying this invention.

Referring now to the drawing, identical numerals will be employed to designate identical parts. In Fig. 1 numeral 11 designates generally a mud pump in accordance with this invention provided with a plurality of diaphragm units 12 which are connected to piston cylinders 13 as will be described further. The piston cylinders 13 are connected to a power transmission unit 14 which receives power through the pulley 15 which suitably may be connected by a belt or chain drive to an electric motor or to a steam turbine, as desired, the pulley 15 being suitably mounted on the axle 16.

Arranged adjacent to the power transmission unit 14, but not necessarily, are a plurality of tanks 17 in which is maintained a body of hydraulic fluid. The tanks 17 are four in number and provide a separate source of hydraulic fluid for each of the diaphragm units 12. Thus conduits 18 each communicate with a separate diaphragm unit 12. The hydraulic tanks 17 are provided with relief valves and a connection for filling with hydraulic fluids when required. These relief valves and fill-up connections are generally indicated by the numeral 19, each tank having a separate connection.

The tanks 17 are provided with a supply of regulated air under pressure by means of conduit 20. Check valves 21 are provided for each of the tanks 17 to prevent hydraulic fluid from flowing into line 20 in case pressure should build up therein and in the case when pressure is not relieved.

Arranged between the diaphragm units 12 and the piston cylinders 13 are intake valve pots 22 and discharge valve pots 23. Connected to the discharge valve pots is a discharge line 24 while connected to the intake valve pots is a suction line 25. The suction line connects to the mud pit while the discharge line is suitably connected into the circulating system wherein the drilling fluid is pumped down the drill stem in the well bore.

The whole assembly including the transmission means and the pump units is suitably mounted on a base member 26 which may be a skid to allow the apparatus to be readily transportable.

Figure 2:
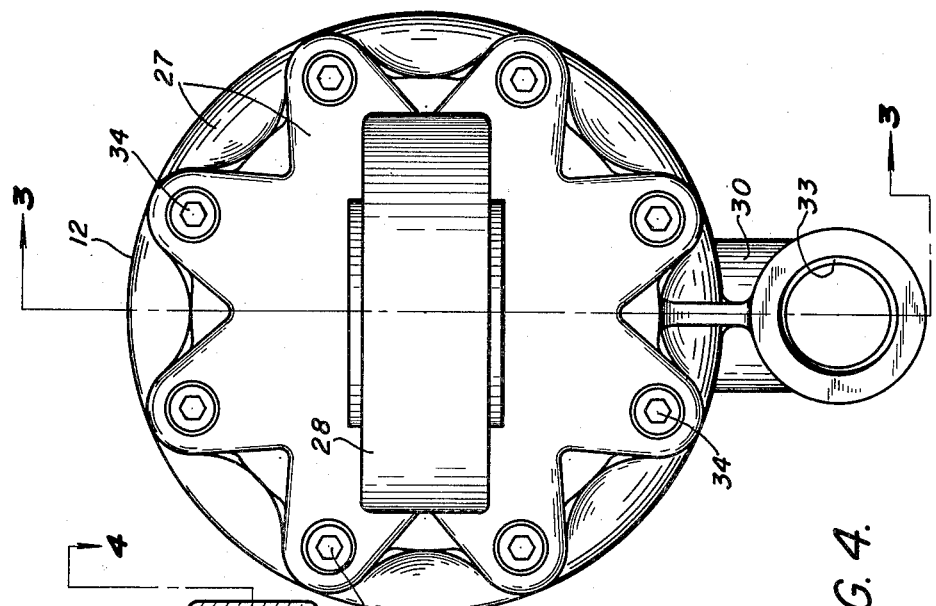
Fig. 2 is a front elevational view of a diaphragm unit of Fig. 1.
Figure 4:
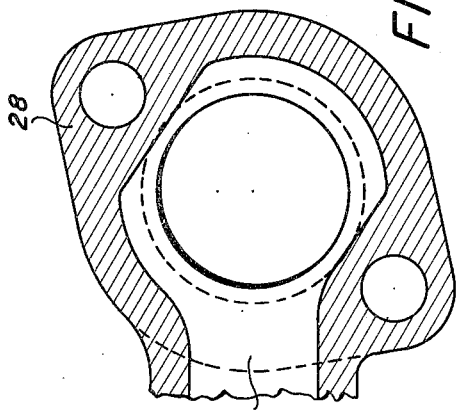
Fig. 4 is a sectional view taken along the lines B—B of Fig. 3.
Figure 3:
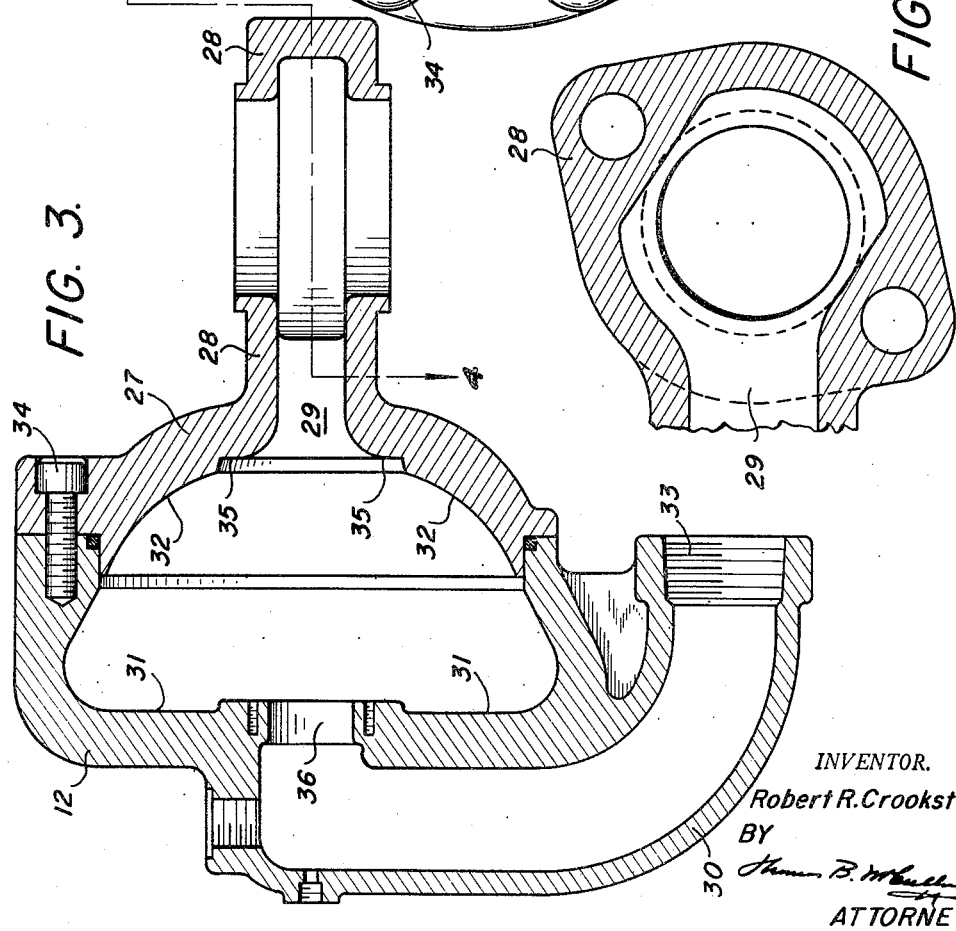
Fig. 3 is a sectional view taken along lines A—A of Fig. 2.

Referring now to Figs. 2 to 4 specifically, a diaphragm unit 12 is provided with a cover plate 27 which forms part of the diaphragm unit 12 and is of a concave shape. The cover plate 27 has an extension 28 which defines a passageway 29 and forms part of the intake valve pots 22. The diaphragm unit 12 has a fluid piston conduit 30 which is cast as part of the diaphragm unit 12. The assembly including the diaphragm unit 12 defines an inner relatively flat surface 31 and an inner relatively concave surface 32. The conduit 30 is adapted to be connected by a suitable threaded connection 33 to one of the piston cylinders 13. It will be noted that the parts of the diaphragm unit 12 are suitably bolted together by bolts 34. The diaphragm unit 12 adjacent passageway 29 defines an annular shoulder 35. It will be noted that conduit 30 discharges fluid into and receives fluid discharged out of diaphragm unit 12 by way of passageway 36.

Figure 5:
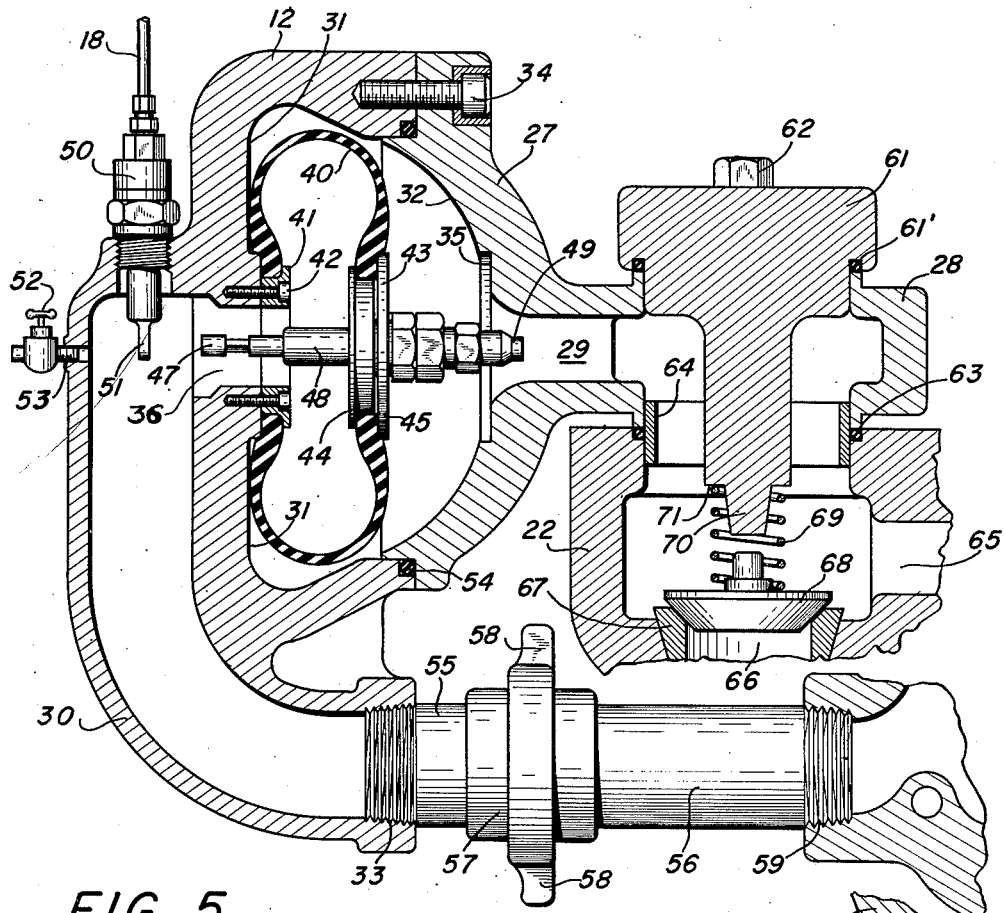
Fig. 5 is a sectional view through the diaphragm unit and valves of Fig. 1.

Referring now to Fig. 5, a diaphragm 40 having a generally tire shape is arranged in the diaphragm unit 12. This diaphragm is connected to the fluid piston end of the unit 12 by means of an annular plate 41 which is bolted to the diaphragm unit 12 by threaded bolt 42. The diaphragm unit 40 is provided with a plate member 43 which is suitably made up of two plates 44 and 45. This plate member 43 serves as a rigid supporting member for the diaphragm 40. Connected to the plate 44 is a valve actuating member 47 and connected to the plates 44 and 45 is a release valve assembly 48, the actuating member 47 being connected to the assembly 48. This assembly is shown in more detail in Fig. 6. The valve assembly 48 has a release end 49 which will be described in more detail.

Mounted on the diaphragm unit on housing 12 is an injection valve 50 which connects by conduit 18 to the hydraulic fluid tank 17. The injection valve 50 has an actuating member 51 that protrudes into the diaphragm unit 12 and particularly the upper portion of the conduit 30 adjacent passageway 36. It will be noted that the actuating member 47 is in operative relationship to the valve actuating member 51. The diaphragm unit 12 is provided with a manual release valve 52 which is connected by a threaded connection 53 to the diaphragm unit 12.

The cover plate 27 is sealed against leakage by an O-ring 54.

The threaded connection 33 is connected to a conduit 55 which, in turn, is connected by a coupling union 57, having hammer nuts 58, to conduit 56 which has a threaded connection 59 and connects into main cylinder head 60, either through the piston end or the rod end as will be described.

The extension member 28 of the cover plate 27 forms part of the intake valve pot 22. Connected to the intake valve pot 22 is a plug member 61 which is bolted by bolts 62 to the valve pot 22, the extension member 28 forming part of the valve pot 22. The member 28 is sealed to the plug 61 by O-ring 61' and sealed to the valve pot 22 by O-ring 63. An annular sleeve 64 is arranged in the valve pot 22 at the juncture of the extension member 28 with the valve pot 22. The valve pot 22 has an outlet port 65 which connects to the discharge valve 23 and an inlet port 66 which is connected to the suction line 25. An annular valve seat 67 is provided in the inlet 66 on which normally rests a valve member 68. The valve member 68 is normally urged against the seat 67 by a biasing means, such as a helical coil spring 69, which is arranged between a downward extension 70 of the plug 61 and the valve member 68, the extension 70 serving to limit the upward travel of the valve 68 on overcoming the spring 69. The spring 69 encloses the extension 70 and is confined by the valve member 68 and a shoulder 71 formed by the plug 61 and extension 70.

Figure 6:
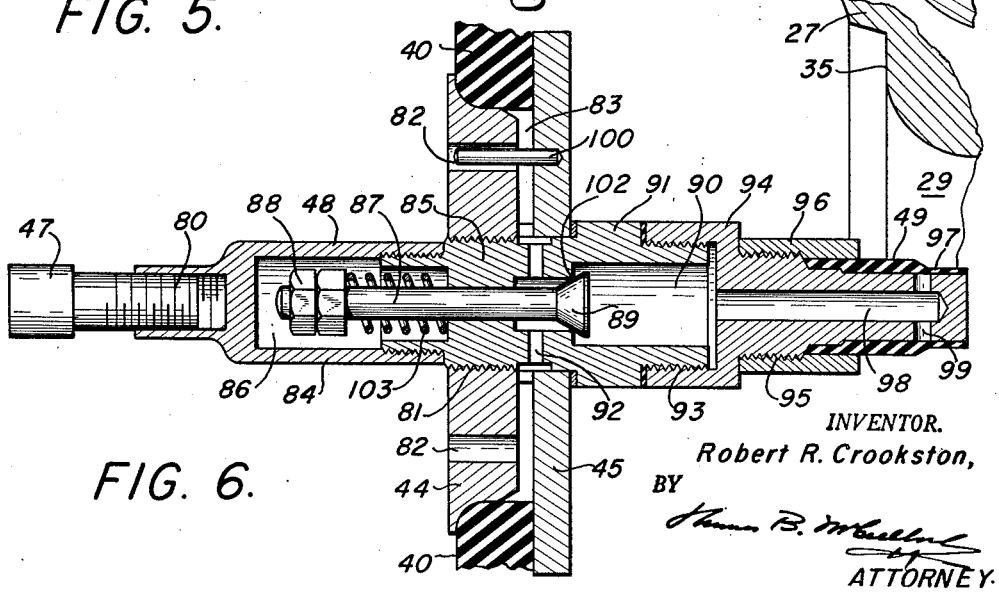
Fig. 6 is a sectional view of the release valve of Fig. 5.

Referring now to Fig. 6, it will be seen that the actuating member 47 is threaded to the valve 48 by mating threads 80 and that some adjustment of member 47 is provided for in the particular arrangement. The valve 48, in turn, is threadably connected by mating threads 81 to the plate 44. The plate 44 is provided with passageways 82 which lead into a space 83 between the plates 44 and 45. Valve member 48 has a cup-shaped sleeve 84 which is connected to a plug member 85 which, in turn, is connected as indicated by threads 81 to the plate 44. The sleeve 48 and the plug 85 provide a chamber 86 into which protrudes a valve arm 87, the free end of which is provided with threaded nuts 88. The valve arm 87 is provided with a valve member 89 arranged in a chamber 90 of that portion 91 of the valve 48 which is connected to the plate 45. The plug 85 is provided with passageways 92 to allow flow from passageway 82 of plate 45 into the chamber 90. Connected to the portion 91 by means of mating threads 93 is a member 94 which, in turn, is threadably connected by mating thread 95 to a sleeve 96 on release end 49 of the valve assembly 48. Arranged between the sleeve 96 and the member 94 is an annular sleeve valve 97 which is suitably constructed of a deformable material, such as natural or synthetic rubber. Leading from the chamber 90 is a passageway 98 which communicates with lateral passageways 99 which are covered by the sleeve valve 97. As the sleeve valve 97 flexes outwardly, the passageways 99 are uncovered providing an outlet from the chamber 90.

Arranged in plate 45 is a dowel pin 100 which fits into one of the passageways 82 of the plate 44. The dowel pin 100 serves to prevent the several portions of the valve from becoming unthreaded by rotation. The valve element 89 is designed to seat against seat 102 to maintain the valve in the closed position. A biasing means, such as a helical coil spring 103, arranged between nuts 88 and plug 85, normally urges the valve member 89 against the seat 102.

Referring now to Fig. 7, an assembly of the pumping apparatus is shown in cross section. Arranged in the piston cylinders 13 are piston liners 120. Only one liner to a cylinder is shown in this view for simplicity. A piston 121 is arranged in the liners 120 connected to piston arms 122 which, in turn, connects to the power transmitting unit 14 by means not shown. The diaphragm units 12 are connected to the piston cylinders 13 by a conduit 56. The conduit 56 may either connect to the piston ends 123 of main cylinder head 60, as shown, or they may connect to the rod end 124. In any event, the conduits 56 connect to conduit 30 of the diaphragm unit 12 as described with respect to Fig. 5.

Connected to the passageway 29 as indicated in Fig. 5 is conduit 65 which, in turn, connects into the discharge valve 23, not shown, in this figure. The conduit 65 passes around the cylinders 13 by passageway 125 which connects into the passageway 126 in the pump assembly 11. This passageway is connected by a suitable flange connection 127 to the discharge line 24 not shown in this figure.

It will be noted in this figure of the drawing and in Fig. 1 that the tanks 17 are provided with level indicators 128 to allow the level of hydraulic fluid in the tank 17 to be ascertained. It will be further noted that the conduits 18 are provided with check valves 129 to prevent back flow of hydraulic fluid in the conduit 18.

Referring now to Fig. 8, an end view is shown of the piston cylinder 13 which is provided with a piston liner 120 and a piston liner sub 140. The piston 121 is held on the piston rod 122 by a hex nut 141. In this figure of the drawing the passageway 125 around the piston liner 120 and the liner sub 140 is shown in more detail. It will be noted that the discharge port 65 connects into passageway 125 which, in turn, connects to the discharge valve pot 23. The discharge valve pot 23 has an inlet 142 and an outlet 143 which connects into the discharge passageway 126. The valve pot 23 has a cover or plug 144 which is provided with a recess portion 145. The plug is held on the discharge valve 23 by suitable bolt connections and the like 146. The plug 144 has an annular downwardly extending member 147. A valve member 148 has an upwardly extending member 149 which is adapted to fit and move into the recess 145. Arranged between the downwardly extending member 147 and the valve member 148 is a biasing means 150, such as a helical coil spring which normally urges the valve member 148 against the annular seating member 151 arranged in the inlet 142.

Referring now to Figs. 9 to 11, the piston cylinder 13 is provided with a bolted end member 160 on the piston end 123 which is secured to the piston cylinders 13 by threaded bolts 161. Piston cylinders 13 have a closure member 162 which suitably may be a hammer nut. Arranged in the piston cylinder 13 are liner subs 140 which define with the piston cylinder 13 the mud passageways 125. The liner subs 140 are suitably separated by an annular sleeve 163 and a packing 164. It will be noted that the end member 162 is connected to the member 160 by square threads 165 and is sealed with a sealing member 166. The piston cylinder 13 is connected to the diaphragm unit 12 and the attending conduits 56 by threaded connections 167 in the piston end 123 of main cylinder head 60 and the rod end of the piston cylinder 13.

The rod end 124 of the piston cylinder 13 is suitably connected to the piston cylinder by means of threaded bolts 171. A closure member 172 is provided with a packing gland assembly 173 through which the piston rod 122 protrudes. A packing assembly including an annular plate 174, packing material 175 and an annular sleeve 176 serve to prevent leakage from the piston rod end 172. The threaded bolts 171 connect into the power transmission unit 14 which serve to house the crank shaft of the power transmission unit.

The piston rod end is suitably sealed against leakage by means of a gasket, such as 180, and sealing members 181 which may be O-rings. Likewise, the member 160 is provided with a gasket 182 and suitably sealed with a sealing member 183 which may be an O-ring. The liner 120 and the liner subs 140 are also sealed by packing members 184 and 185 which also may be O-rings.

Figure 12:
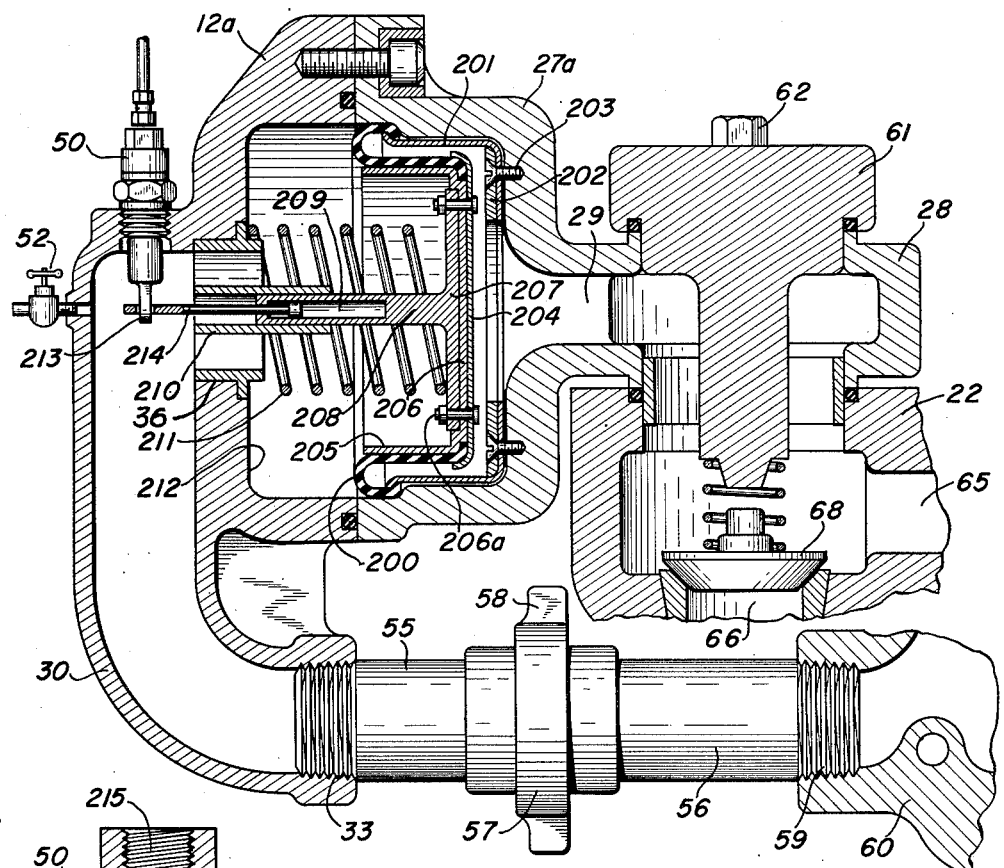
Fig. 12 shows another embodiment of the invention employing a different type of diaphragm.
Figure 13:
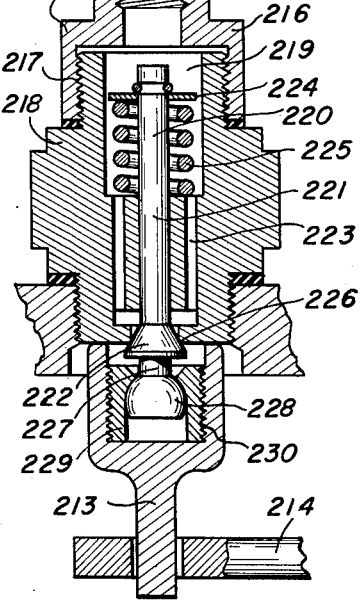
Fig. 13 is a cross-sectional view of the injection valve means of the several figures of the drawing.

The apparatus of Figs. 12 and 13 is a modification of the apparatus of Fig. 5 in that the tire-shaped diaphragm 40 has been replaced by a diaphragm 200 of a different type. In this embodiment of the invention, the diaphragm 200 is retained in the diaphragm unit or housing 12a between a modified cover plate 27a and an insert member 201 which follows the general configuration of the cover plate 27a. This insert member 201 is held against the interior of the cover plate 27a by means of an annular plate 202 which is secured to the cover plate 27a by means of threaded screws 203. The diaphragm 200 has a flat rigid member 204 which is connected to an annular sleeve 205 which has a bottom flat member 206 which fits snugly and held against the member 204 by threaded bolts 206a. Connected to the members 205 and 206 is a member 207 which has an extension member 208 providing an internal chamber 209. The extension member 208 is slidably arranged in a spider sleeve 210 which is arranged in the passageway 36. A biasing means 211 is arranged between the plate 207 and the surface 212 of the diaphragm unit 12. Thus it will be seen that the spring 211 normally urges the diaphragm 200 to the right.

An injection valve 50 is provided with a valve actuating means 213 which is connected to an actuating member 214, the end of which is slidably arranged in the chamber 209 such that movement of the diaphragm 200 and the extension member 208 to the left causes the actuating members 214 and 213 to become operative.

In Fig. 13 a sectional view of the valve 50 is given. It will be noted that the valve 50 is provided with an inlet 215 which connects by conduit 18 to hydraulic tank 17. The inlet 215 is located in a plug 216 which threadably engages by mating threads 217 with the main body 218 of the valve 50. The main body 218 is provided with a chamber 219 in which is arranged a valve element 220 including an arm 221 and a closure member 222. The main valve body 218 is provided with vertical passageways 223. The valve arm 221 has an annular plate 224 arranged adjacent an upper end of the arm 221. Between the plate 224 and the passageways 223 is a biasing means, such as a helical coil spring 225, which normally urges the valve member 222 in seating relationship with the seat 226.

Surrounding the lower end of the valve member 222 is the valve actuating member 213. The valve 222 has a downwardly projecting member 227 which terminates in a spherical member 228 which is movably arranged in a sleeve 229 which is threaded by mating threads 230 in the valve actuating member 213.

Figure 14:
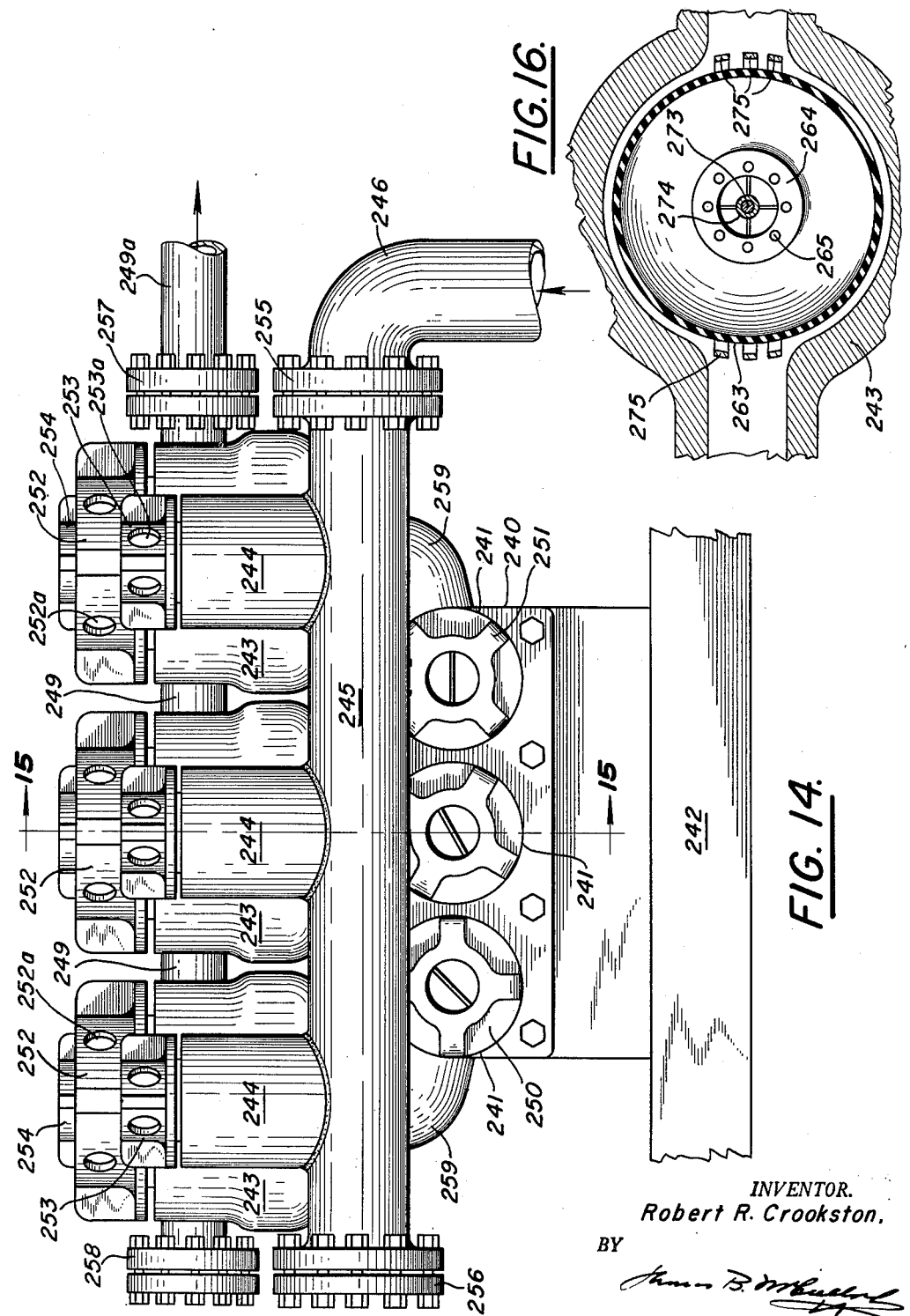
Fig. 14 is a view of another pump embodying this invention.
Figure 15:
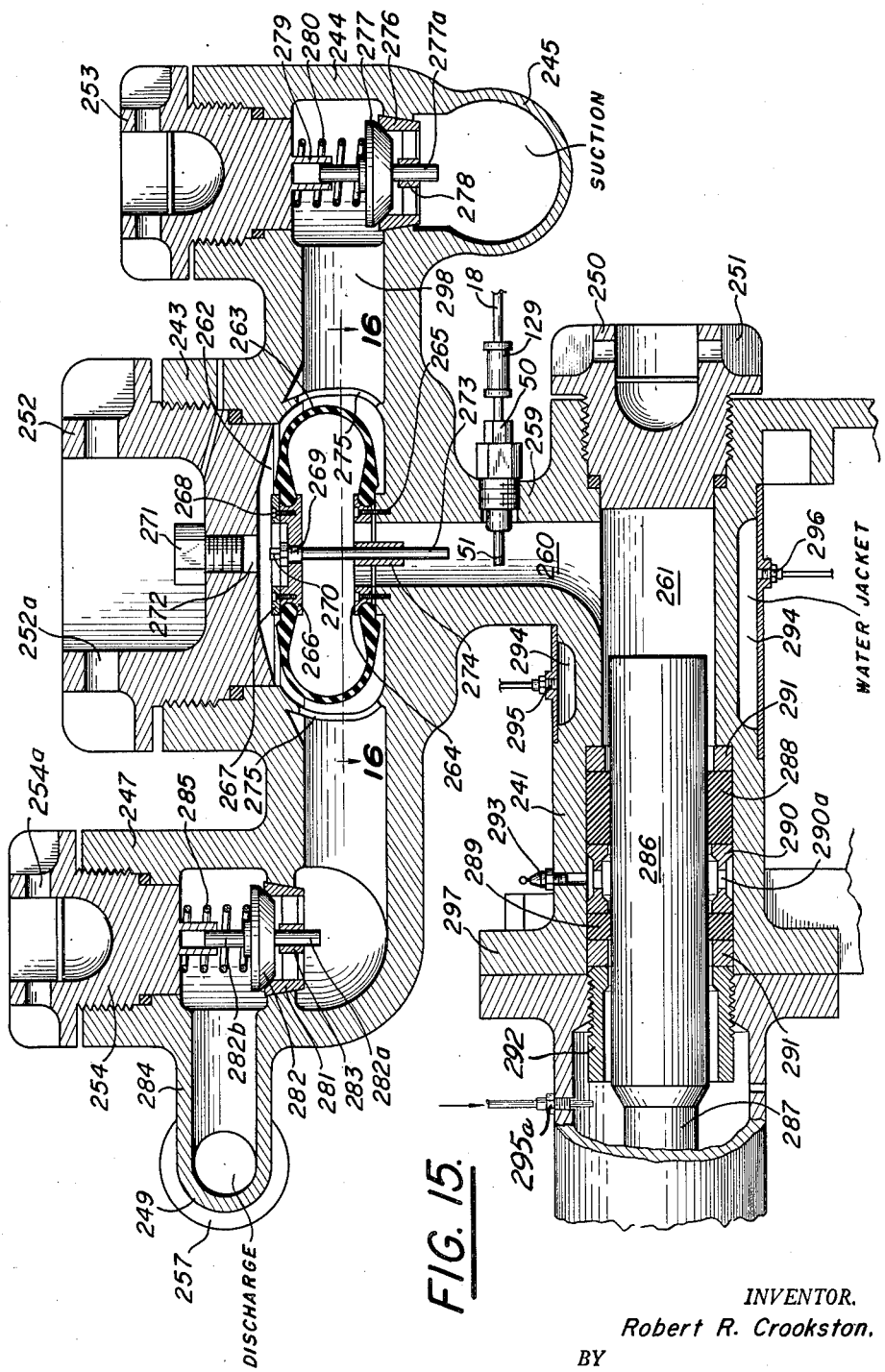
Fig. 15 is a sectional view along the lines 15—15 of Fig. 14.

Referring now to Figs. 14 to 16, numeral 240 designates generally a triplex pump in accordance with the present invention provided with three piston cylinders 241, the pump being mounted on a base member 242 similar to Fig. 1 for transportation. The triplex pump 240 has three diaphragm housings 243, each of which is connected by an inlet valve 244 to an inlet line 245 which communicates with the section line 246 leading from the mud pit. The diaphragm housings 243 are each provided with an outlet valve 247 shown more clearly in Fig. 15. Each of the outlet valves 247 are connected by a conduit 248 to a discharge line 249 which supplies mud to the drilling operation through line 249a.

The piston cylinders 241 are closed on the piston end by a threaded cover 250, each of which is provided with a hammer nut 251.

The diaphragm housings 243 are provided with threaded covers 252, each of which is provided with ports 252a for insertion of tools for removing the covers 252.

The valves 244 and 247 are also provided with threaded covers or plugs 253 and 254, respectively. The threaded covers 253 and 254 are provided with ports 253a and 254a for insertion of tools, respectively, to remove same.

The suction line 245 is connected to line 246 by a bolted flange 255 and the line 245 is provided with a blank flange 256 closing the end of same which likewise is bolted to line 245. The discharge line 249 has a bolted flange 257 and a second bolted blank flange 258. The blank flanges 256 and 258 allow access to the lines 245 and 249 while the flanges 255 and 257 also allow ready dismantling of the apparatus for moving same.

It is to be noted that the diaphragm housings 243 are connected to the pump cylinders 241 by sections 259 which are provided with passageways 260 which communicates with the interior 261 of the piston cylinder 241.

Arranged in a chamber 262 of the diaphragm housings 243 is a tire-shaped diaphragm 263 which is connected to the diaphragm housing by a first plate 264 which, in turn, is connected to the housing 243 by screw threads 265. The diaphragm 263 is provided with a second and third plate 266 and 267, respectively, which serve to confine the diaphragm 263, the plates being held together by threaded screws 268. Connected to the plate 266 is a release valve member 269 which is provided with a valve member 270 which serves to release hydraulic fluid, as will be described, into the mud stream by contact with a threaded plug 271 which serves to close the passageway 272 in the valve cover 252. Valve member 270 is constructed similarly to valve 48 of Fig. 6.

The plate 266 has a downwardly depending member or valve activator 273 which is arranged in a spider 274 which serves as a guide member for the activator 273.

Confining and providing lateral support for the diaphragm 263 when it is in its extended position in housing 243 are a plurality of ribs 275 which are shown more clearly in Fig. 16.

The inlet valve 244 has a seating member 276 on which a valve member 277 is arranged shown in closed position. The valve member 277 has a downwardly depending member 277a which is arranged in a spider 278 which forms a support and guide for the member 277a. The valve 277 has also an upwardly extending member 277b which is slidably mounted in a downwardly depending member 279 which forms a part of the cover plate or plug 253. Arranged between the cover plate of plug 253 and the valve member 277 is a biasing means, such as a helical coil spring 280, which serves to bias the valve member 277 onto the seat 276.

The outlet valve housing 247 is likewise provided with a valve seat 281 on which is arranged a valve member 282. Valve member 282 is provided with a downwardly depending member 282a which is arranged in a spider 283 and which serves as a guide member. The valve plug 254 is provided with a downwardly depending member 284 into which a slidable upwardly extending member 282b of the valve 282 is arranged which serves as a guide for same. Arranged between the plug 254 and the valve member 282 is a biasing means, such as a helical coil spring 285.

The piston cylinder 241 has slidably arranged therein a piston 286 which is connected by a piston rod 287 to suitable motivating means not shown. The piston has rubber packing members 288 and 289 which may be any suitable deformable material or packing means separated by metallic members 290 provided with ports 290a. The packing members 288 and 289 are provided with metallic bushings 291, the whole packing assembly being held tightly in the piston cylinder 241 by means of a threaded packing nut 292.

Lubricating means 293 are provided for injecting a suitable lubricant into the piston cylinder 241 through the port 290a to lubricate the piston 286.

It is to be noted that the piston cylinder 241 is provided with a water jacket 294 and with means 295 for introducing water or cooling fluid into jacket 294. Likewise, the water jacket 294 is provided with means 296 for circulating the cooling fluid through the jacket 294. It is also to be noted that spray cooling means 295a may be used to cool the piston. Either or both the water jacket and spraying means may be employed.

The piston cylinder 241 is so constructed with a bolted flange 297 to allow easy access to the internal working parts.

The diaphragm housing 243 is provided in section 259 with an injection valve 50 provided with a check valve 129 similar to injection valve 50 and check valve 129 of the other embodiments of this invention. It is to be noted that the actuating member 51 of the injection valve 50 protrudes into the passageway 260 in operative relationship with the actuating member 273.

Figure 17:
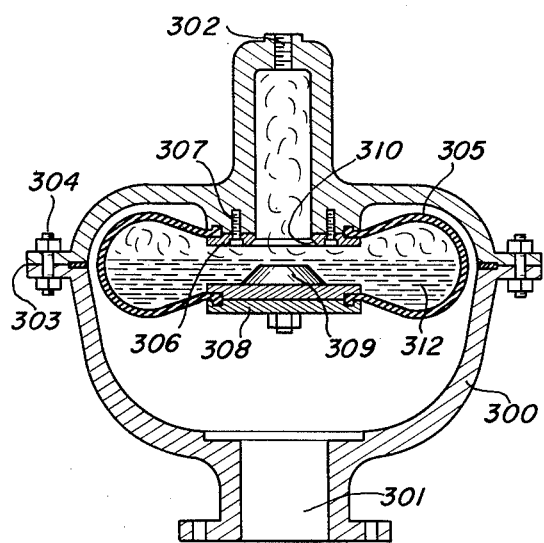
Fig. 17 is a sectional view of a diaphragm unit adapted for employment as a pulsation dampener.

Referring now to Figs. 17 to 20, embodiments are shown of apparatus suitable for use as pulsation dampeners. Referring specifically to Fig. 17, a housing 300 is provided with a fluid passageway 301 and a second fluid passageway 302. The housing 300 may be constructed in two parts which are suitably bolted together at connections 303 by threaded bolts 304.

Arranged in the housing 300 is a tire-shaped diaphragm 305 which is suitably connected to the housing 300 by an annular plate 306 and threaded bolts 307. The diaphragm 305 has a plate member 308 connected to the diaphragm which, in turn, has a closure member 309 which is designed to seat against the seat 310 of the member 311 which connects to passageway 302. The diaphragm 305 is designed to contain a body of fluid, such as water 312, to prevent collapse of the diaphragm 305 as will be described.

Figure 18:
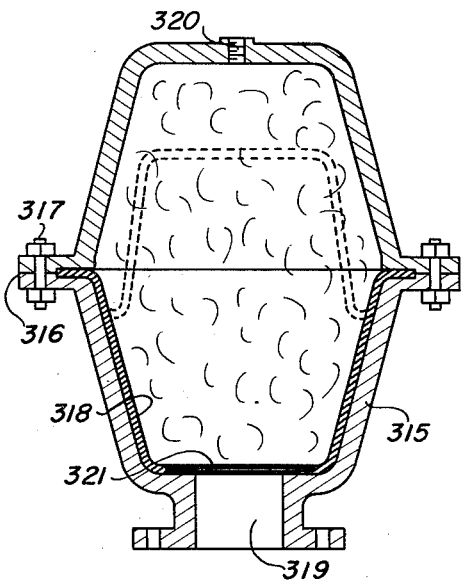
Fig. 18 is a modification of the device of Fig. 17.

In the embodiment of Fig. 18, a housing 315 of different shape than that of Fig. 17 may also be suitably constructed in two parts held together by closure 316 and threaded bolts 317. Arranged between the two halves of the housing 315 is a sock-shaped diaphragm 318 which, when in relaxed condition, will cover a passageway 319, as shown. A second inlet 320 is provided for injection of gas into the housing 315. The diaphragm 318 may suitably be reinforced with a steel disc, such as 321.

Figure 19:
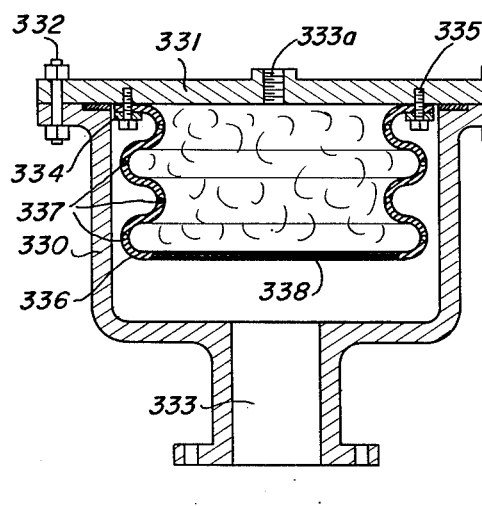
Fig. 19 is a further modification of the apparatus of Fig. 17.

In the embodiment of Fig. 19 a housing 330 is provided with a cover plate 331 and with threaded bolts 332 which serve to secure the cover plate 331 to the housing 330. The housing 330 has a first passageway 333 and a second passageway 333a by way of which gas may be introduced into the housing 330. Connected to the cover plate 331 by means of an annular plate 334 and threaded bolts 335 in the housing 330 is a bellows-shaped diaphragm 336 of the general configuration as shown which may be suitably reinforced with steel rings 337 and a steel disc 338.

Figure 20:
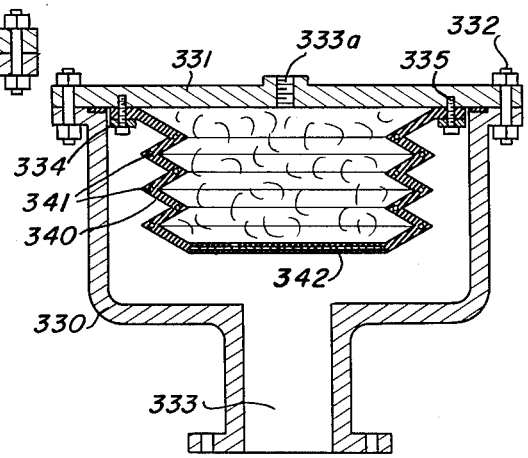
Fig. 20 is a modified diaphragm suitable for use in the embodiment of Fig. 19.

In the device of Fig. 20 a modification of the diaphragm of Fig. 19 is shown. In this embodiment a bellows-shaped diaphragm 340 of the general configuration as shown reinforced with steel rings 341 is provided. This diaphragm is provided with a steel plate 342.

The apparatus of the present invention when employed to pump fluids operates in the following manner:

The device is connected by conduits 24 and 25 into a mud system of an oil well drilling operation with the conduit 25 taking suction on the mud pit and the conduit 24 discharging mud fluid into the drill stem. The pump rods or piston arms 122 would be actuated by the power transmission unit 14 to cause reciprocating movement in the piston cylinders 13.

Referring particularly to Figs. 5 and 7, it will be seen that one of the pistons is nearing the end of its stroke against the piston end and the other piston is nearing the end of its stroke adjacent the piston rod end of the piston cylinder. Hydraulic fluid is being forced into the upper left diaphragm unit 12 causing the diaphragm 40 to flex outwardly and to force mud out through the passage 29, this mud having previously been drawn into the diaphragm unit 12 on the reverse stroke of the piston 121, the flow being indicated by the arrow. In the upper right diaphragm unit 12 mud is being drawn into the diaphragm unit 12 on the underside of the diaphragm and hydraulic fluid is being drawn out of the diaphragm following the flow of the arrows into the piston cylinder 13. In the lower left diaphragm unit the pressure stroke has just about begun and mud is being forced out through 29 and hydraulic fluid is coming into the diaphragm 40 as indicated by the arrows, whereas in the lower right diaphragm unit 12 the suction stroke has just about begun with mud coming in through 29 and hydraulic fluid flowing through 56 into the lower piston cylinder 13. Thus with the reciprocating motion of the hydraulic fluid in the upper left diaphragm 12, the pressure stroke is about over and in the upper right end the suction stroke is about over, whereas in the lower left diaphragm unit the pressure stroke has just begun and in the lower right diaphragm the section stroke has just about begun.

In this device the mud never comes into the piston cylinders but hydraulic fluid is reciprocated between the diaphragm units and the piston cylinders. The piston cylinders contain hydraulic fluid at all times such that the piston liners are not worn by the abrasive characteristics of the mud. The mud flows only in contact with the diaphragm units and never contacts the moving parts of the pump system.

The invention including an apparatus for transmitting pressure to fluids also includes an injection valve and a release valve. To this end, referring to Fig. 5 it will be seen that hydraulic fluid may be injected into the hydraulic system through injection valve 50. For example, if the hydraulic fluid should be lost for any reason and makeup be required, the diaphragm 40 would, as a result of the drop in hydraulic fluid, be forced to the left a greater than normal degree causing the actuating member 47 to contact the valve actuating means 51 in Fig. 1 or 213 in Fig. 13. This would cause the member 213 or 51 to move to the left rotating it about the spherical member 228 and causing the unseating of the valve member 222, allowing hydraulic fluid to flow from conduit 18 and tank 17 into the system. Likewise, when the amount of hydraulic fluid in the reciprocating system becomes too great, the diaphragm 40 will move to the right a greater degree than it normally does. This will allow the plate 45 to be seated against shoulder 35 which will cause the excess amount of hydraulic fluid to unseat the valve member 89 from the seat 102 allowing hydraulic fluid to pass through passageways 82 and 92 to chamber 90 and then to passageway 98 to passageway 99 and out by distending the sleeve valve 97 under the reciprocating pressure of the hydraulic fluid.

Referring to Fig. 8 it will be seen that on the suction stroke the mud flow overcomes the spring 69 and forces the valve member 68 off of the seat 67 allowing mud to flow in through passage 29 into the diaphragm unit 12. On the return stroke the valve 68 seats against seat 67 and mud flows outwardly from the diaphragm 40 through outlet 65 and passageway 125 forcing valve 148 upwardly overcoming spring 150 and out through conduit 143 and conduit 24 to the drill stem.

The triplex pump of Figs. 14 to 16 operates as follows:

It is to be assumed that line 246 is connected to a mud pit and discharge line 249 is connected to the drill stem for circulating drilling fluid down the well. The piston 286 is caused to reciprocate by the rod 237 which forces a hydraulic fluid of the type mentioned in the chamber 261 into the chamber 262 which causes the diaphragm 263 to flex. This causes any drilling mud in the passageway 298 to be forced into discharge line 249 by causing the valve 282 to be unseated by overcoming the spring 285. On the suction stroke the piston 286 moves to the left which serves to collapse the diaphragm 263, spring 285 closing valve 282 and causing valve 277 by virtue of the reduced pressure to overcome the spring 280 drawing in drilling fluid through lines 246 and 245 into the valve 244 which fills passageway 298 such that on the discharge stroke the valve 277 is closed and the valve 282 is opened forcing the mud into line 249.

Should the hydraulic fluid in passageway 260 in chamber 261 be lost for any reason, the actuating member 273 will be caused to come into contact with the member 51 which will open the injection valve 50 and allow hydraulic fluid to supply that which has been lost. On the other hand, if the amount of hydraulic fluid in the diaphragm 263, passageway 260 and chamber 261 becomes excessive, then the member 270 will come into contact with the screw thread plug 271 causing hydraulic fluid to be released through valve 269 into the passageway 290 and thence discharged with the mud stream.

It is to be noted that the plates 266 and 267 are in contact with both the hydraulic fluid and the drilling mud. This plate serves to dissipate heat which may build up and accumulate in the hydraulic fluid by virtue of the work being put on it. Also any heat which may accumulate in the hydraulic fluid may be dissipated by circulating cooling fluid through the jacket 294 by circulating means 295 and 296.

It will be seen that the triplex pump of Figs. 14 to 16 forms a workable unit which is efficient in pumping drilling mud and other abrasive fluids, the abrasive fluids being maintained out of contact with the pump cylinder and the piston reciprocating in the pump cylinder.

The device of the present invention is suitable for use for transmitting fluid pressure, such as pumping abrasive fluids and the like, or for use as a pulsation dampener. In this respect referring to Figs. 17 to 20, the device of Fig. 17 might suitably be connected into a mud system employing a conventional type pump with the mud pressure being exerted through passageway 301 against the diaphragm 305 of Fig. 14. Nitrogen or other inert gas pressure may be exerted against diaphragm 305 through passageway 302 by suitable connection to a source of such inert gas. Thus the pressure surging in the system to which passageway 301 is connected would be compensated for by the diaphragm 305. It would be desirable to prevent collapse of the diaphragm to provide in the diaphragm unit a body of fluid, such as water. If nitrogen or other inert gas pressure should be lost, the mud pressure would force the seating member 309 in seating engagement with 310 which would allow the water to support the diaphragm until pressure could be restored.

In the apparatus of Fig. 18 the passageway 319 would suitably be connected into a mud line and the inlet 320 into a source of inert gas, such as nitrogen. The fluctuation of pressure would be taken up by flexing of the diaphragm to the position as shown by the dotted lines in Fig. 18.

In Figs. 19 and 20, similar operations are obtained with the different embodiments of the diaphragm.

The invention as described with respect to Figs. 1 to 13 has been used in pumping various fluids over a period of several months. For example, the diaphragm, such as 40, employed in the diaphragm unit 12 has been flexed above 10,000,000 cycles before failure of the diaphragm. The remarkable success of this particular apparatus is attributed to the fact that the diaphragm employed in the present invention is essentially supported at all times and that its internal reinforcing cords are not harmfully stretched as the tire changes shape to displace volume. Thus the housing in the embodiment of Figs. 1 to 11 has a shape such that it has a relatively flat inner surface and a relatively concave inner surface. Thus when the diaphragm is in the relaxed position, it is supported by the flat surface; when it is in the extended or expanded condition, it is supported against excessive distortion by the concave surface. In other words, the housing of the diaphragm unit acts much like an automobile tire does to support the inner tube and prevent the inner tube from being destroyed by the rough treatment to which it is put. The diaphragm is also supported by the plate member 43.

In the embodiment of Fig. 12 the same result is achieved by supporting the diaphragm against housing 12a, cover plate 27a and member 201 when it is in its relaxed position and also supporting the diaphragm with the annular member 205 and the plate 204. The same holds true for the diaphragms of Figs. 17 to 20 in that the diaphragms are provided, with respect to Fig. 17, with adequate support at all times and, with respect to Figs. 18 and 19, the reinforcing members and the general internal configuration of the housing provides the support required to prevent destruction.

In the embodiments of Figs. 1 and 7 it will be noted that hydraulic fluid is moved in and out of the diaphragm units 12 by the reciprocating movement of the piston 121. Actually the hydraulic fluid ahead of the pistons 121 serves as a first liquid piston and the hydraulic fluid behind the piston 122 serves as a second liquid piston, the two liquid pistons being moved by the piston 121 connected to the piston rod 122, the reciprocating motion of the piston 121 imparting a like motion to the liquid pistons separated by the pistons 121.

The hydraulic fluid employed in the present invention may be a suitable hydraulic oil, such as a mineral oil, or it may be an aqueous medium. It is preferred to use as a hydraulic fluid any non-corrosive, non-abrasive liquid which will lubricate and cool the piston and packing material.

The diaphragms employed in the several embodiments of this invention should be constructed of a suitable deformable material which may be rubber, either natural or synthetic, depending on the service to which the pumping equipment is put. The diaphragms employed in the several embodiments of the present invention should suitably be provided with reinforcing. This reinforcing may constitute an internal part of the construction of the diaphragms and may comprise nylon, cotton, silk, and the like fabric reinforcing cords. The diaphragms may be suitably reinforced with other fabric material to give proper internal reinforcement to the diaphragm. The reinforcing fiber or fabric employed in the diaphragm of the present invention provides for long and continued life with flexing of the diaphragm in pumping fluid or in transmitting fluid pressure. The reinforced diaphragm changes shape and volume without the reinforcing fibers being ruptured. Of course, it is to be realized that where the hydraulic fluid is a hydrocarbon, an oil resistant deformable material must be secured. The same holds true when the abrasive fluid contains oil, hydrocarbons and the like. There are many synthetic rubbers on the market which will withstand the action of hydrocarbons.

The diaphragms as illustrated in Figs. 5 and 7 have been constructed and used satisfactorily for almost 10,000,000 cycles at two different times. These diaphragms were actually Goodyear nylon fabric aviation tires of rubber composition.

The invention is of considerable advantage and utility in that the pumping system may be used advantageously in pumping abrasive fluids, such as suspension of finely divided systems, in aqueous or oily media. It may be employed suitably in oil well drilling operations or in chemical manufacture where slurries or suspensions must be moved from one place to another by pumping. It is intended that my apparatus may be used for such service.

Likewise the embodiments which are used for adsorption of pressure and for taking up pressure surges in pressure systems may be used in other pumping or pressure operations besides those involving mud being pumped under pressure.

It is to be emphasized that features of the present invention comprise a reinforced diaphragm which is confined or supported while in flexing operation. The employment of a fluid connecting rod or piston is essential in the present invention in maintaining the abrasive fluid which is being pumped out of contact with the mechanical piston. Also important in the present invention is the dissipation of heat. This may be done by conducting the heat away from the liquid piston through the supporting plate which serves to give strength to the diaphragm. It is also possible to prevent thermal build up in the fluid piston or connecting rod by quenching the piston plunger with water or providing for internal water circulation by constructing the plunger of hollow shape. The piston cylinder may also be water jacketed to dissipate heat from the inner fluid piston or connecting rod.

This application contains subject matter common to a co-pending application filed for Robert R. Crookston and Leon Blagg entitled "Pump for Abrasive Fluids," Serial No. 412,291, filed February 24, 1954, now patent No. 2,778,315.

The nature and objects of the present invention having been completely described and illustrated, what I wish to claim as new and useful and to secure by Letters Patent is:

1. In a device for transmitting fluid pressure comprising a housing being formed to provide two fluid passageways and a first relatively flat inner surface and a second concave inner surface and an extensible, retractable, internally reinforced tire-shaped diaphragm arranged in said housing between said passageways separating said housing into first and second chambers and adapted to be supported by said inner surfaces when said diaphragm is in extended and retracted positions.

2. In a device for transmitting fluid pressure comprising a housing being formed to provide two fluid passageways and a first relatively flat inner surface and a second concave inner surface and an extensible, retractable, internally reinforced tire-shaped diaphragm arranged in said housing between said passageways separating said housing into first and second chambers and adapted to be supported by said inner surfaces when said diaphragm is in extended and retracted positions, said diaphragm having a rigid means attached thereto adapted to support and maintain the shape of said diaphragm.

3. In a device for transmitting fluid pressure comprising a housing being formed to provide two fluid passageways and a first relatively flat inner surface and a second concave inner surface, and an extensible, retractable internally reinforced tire-shaped diaphragm arranged in said housing between said passageways separating said housing into first and second chambers and adapted to be supported by said inner surfaces when said diaphragm is in extended and retracted positions, said diaphragm having a rigid means attached thereto adapted to support and maintain the shape of said diaphragm, injection valve means mounted on said housing adapted to inject fluid into said first chamber, and means connected to said rigid means adapted to contact said injection valve means and cause injection of fluid into said first chamber when said rigid means moves a selected distance in one direction.

4. In a device for transmitting fluid pressure comprising a housing being formed to provide two fluid passageways, an extensible, retractable reinforced diaphragm arranged in said housing between said passageways separating said housing into first and second chambers, the interior of said housing being configured so as to provide support for said diaphragm when said diaphragm is in extended and retracted positions, said diaphragm having rigid means attached thereto adapted to support and maintain the shape of said diaphragm, injection valve means mounted on said housing adapted to inject fluid into said first chamber and means connected to said rigid means adapted to contact said injection valve means and cause injection of fluid into said first chamber when said rigid means moves a selected distance in one direction.

5. In a device for transmitting fluid pressure comprising a housing being formed to provide two fluid passageways, an extensible, retractable reinforced diaphragm arranged in said housing between said passageways separating said housing into first and second chambers, the interior of said housing being configured so as to provide support for said diaphragm when said diaphragm is in extended and retracted positions, said diaphragm having rigid means attached thereto adapted to support and maintain the shape of said diaphragm, means connected to said rigid means adapted to contact said injection valve means and cause injection of fluid into said first chamber when said rigid means moves a selected distance in one direction, and release valve means arranged on said rigid means adapted to release fluid from said first to said second chamber when said rigid means moves a selected distance in an opposite direction.

6. In a device for transmitting fluid pressure comprising a housing being formed to provide two fluid passageways and a first relatively flat inner surface and a second concave inner surface, and an extensible, retractable internally reinforced tire-shaped diaphragm arranged in said housing between said passageways separating said housing into first and second chambers and adapted to be supported by said inner surfaces when said diaphragm is in extended and retracted positions, said diaphragm having a rigid means attached thereto adapted to support and maintain the shape of said diaphragm and injection valve means mounted on said housing adapted to inject fluid into said first chamber, means connected to said rigid means adapted to contact said injection valve means and cause injection of fluid into said first chamber when said rigid means moves a selected distance in one direction and release valve means arranged on said rigid means adapted to release fluid from said first to said second chamber when said rigid means moves a selected distance in an opposite direction.

7. In a device for transmitting fluid pressure comprising a housing being formed to provide two fluid passageways, an extensible, retractable reinforced diaphragm arranged in said housing between said passageways separating said housing into first and second chambers, the interior of said housing being configured so as to provide support for said diaphragm when said diaphragm is in extended and retracted positions, said diaphragm having rigid means attached thereto adapted to support and maintain the shape of said diaphragm, and release valve means arranged on said rigid means adapted to release fluid from said first to said second chamber when said rigid means moves a selected distance in one direction.

8. In a device for transmitting fluid pressure comprising a housing being formed to provide two fluid passageways and a first relatively flat inner surface and a second concave inner surface, and an extensible, retractable internally reinforced tire-shaped diaphragm arranged in said housing between said passageways separating said housing into first and second chambers adapted to be supported by said inner surfaces when said diaphragm is in extended and retracted positions, said diaphragm having a rigid means attached thereto adapted to support and maintain the shape of said diaphragm, and release valve means arranged on said rigid means adapted to release fluid from said first to said second chamber when said rigid means moves a selected distance in one direction.

9. In a device for transmitting fluid pressure comprising a housing being formed to provide two fluid passageways, an extensible, retractable reinforced diaphragm arranged in said housing between said passageways separating said housing into first and second chambers, the interior of said housing being configured so as to provide support for said diaphragm when said diaphragm is in extended and retracted positions, said diaphragm having rigid means attached thereto adapted to support and maintain the shape of said diaphragm, release valve means arranged on said rigid means adapted to release fluid from said first to said second chamber when said rigid means moves a selected distance in one direction, and reciprocating fluid piston means fluidly communicating with said first chamber adapted to move said diaphragm.

10. In a device for transmitting fluid pressure comprising a housing being formed to provide two fluid passageways and a first relatively flat inner surface and a second concave inner surface, an extensible, retractable internally reinforced tire-shaped diaphragm arranged in said housing between said passageways separating said housing into first and second chambers adapted to be supported by said inner surfaces when said diaphragm is in extended and retracted positions, said diaphragm having a rigid means attached thereto adapted to support and maintain the shape of said diaphragm, release valve means arranged on said rigid means adapted to release fluid from said first to said second chamber when said rigid means moves a selected distance in one direction, and reciprocating fluid piston means fluidly communicating with said first chamber adapted to move said diaphragm.

11. A device for transmitting fluid pressure comprising a housing being formed to provide two fluid passageways, an extensible, retractable reinforced diaphragm arranged in said housing between said passageways separating said housing into first and second chambers, the interior of said housing being configured so as to provide support for said diaphragm when said diaphragm is in extended and retracted positions, said diaphragm having rigid means attached thereto adapted to support and maintain the shape of said diaphragm, release valve means arranged on said rigid means adapted to release fluid from said first to said second chamber when said rigid means moves a selected distance in one direction, reciprocating fluid piston means fluidly communicating with said first chamber adapted to move said diaphragm, and abrasive fluid valve means adapted to admit and discharge abrasive fluid to and from, respectively, said second chamber.

12. A device for transmitting fluid pressure comprising a housing being formed to provide two fluid passageways and a first relatively flat inner surface and a second concave inner surface, an extensible, retractable internally reinforced tire-shaped diaphragm arranged in said housing between said passageways separating said housing into first and second chambers adapted to be supported by said inner surfaces when said diaphragm is in extended and retracted positions, said diaphragm having a rigid means attached thereto adapted to support and maintain the shape of said diaphragm, release valve means arranged on said rigid means adapted to release fluid from said first to said second chamber when said rigid means moves a selected distance in one direction, reciprocating fluid piston means fluidly communicating with said first chamber adapted to move said diaphragm and abrasive fluid valve means adapted to admit and discharge abrasive fluid to and from, respectively, said second chamber.

13. A device for transmitting fluid pressure comprising a housing being formed to provide two fluid passageways, an extensible, retractable reinforced diaphragm arranged in said housing between said passageways separating said housing into first and second chambers, the interior of said housing being configured so as to provide support for said diaphragm when said diaphragm is in extended and retracted positions, said diaphragm having rigid means attached thereto adapted to support and maintain the shape of said diphragm, release valve means arranged on said rigid means adapted to release fluid from said first to said second chamber when said rigid means moves a selected distance in one direction, reciprocating fluid piston means fluidly communicating with said first chamber adapted to move said diahpragm, abrasive fluid valve means adapted to admit and discharge abrasive fluid to and from, respectively, said second chamber, and means for dissipating heat from said fluid piston.

14. A device for transmitting fluid pressure comprising a housing being formed to provide two fluid passageways and a first relatively flat inner surface and a second concave inner surface, an extensible, retractable internally reinforced tire-shaped diaphragm arranged in said housing between said passageways separating said housing into first and second chambers adapted to be supported by said inner surfaces when said diaphragm is in extended and retracted positions, said diaphragm having a rigid means attached thereto adapted to support and maintain the shape of said diaphragm, release valve means arranged on said rigid means adapted to release fluid from said first to said second chamber when said rigid means moves a selected distance in one direction, reciprocating fluid piston means fluidly communicating with said first chamber adapted to move said diaphragm, abrasive fluid valve means adapted to admit and discharge abrasive fluid to and from, respectively, said second chamber, and means for dissipating heat from said fluid piston.

15. Apparatus for transmitting fluid pressure which comprises, in combination, a housing provided with two fluid passageways, an internally reinforced diaphragm arranged in said housing between said passageways separating the interior of said housing into a first chamber and a second chamber, said housing having an inner flat surface for supporting said diaphragm when collapsed and said diaphragm being provided with a rigid annular supporting member having a flat surface adapted to conform generally to the flat surface of the housing, said annular supporting member maintaining the shape of the diaphragm, an injection valve means on said housing communicating with said first chamber having an actuating member protruding into said first chamber for injecting hydraulic fluid into said first chamber, means connected to said diaphragm for opening said valve on movement of said diaphragm beyond a fixed point in said first chamber into contact with said actuating member, a release valve means in said second chamber connected to said diaphragm for releasing hydraulic fluid from said first chamber to said second chamber on movement of said diaphragm beyond a fixed point in said second chamber, and means for supplying hydraulic fluid under pressure to said injection valve means, said diaphragm being adapted to transmit pressure to fluid in said second chamber on reciprocal motion of said hydraulic fluid and said injection valve means supplying hydraulic fluid to said first chamber to compensate for hydraulic fluid lost from said first chamber.

16. Apparatus for transmitting fluid pressure which comprises, in combination, a housing provided with two fluid passageways having a first relatively flat inner surface and a second concave inner surface, an internally reinforced tire-shaped diaphragm arranged in said housing between said passageways separating the interior of said housing into a first chamber and a second chamber adapted to be supported by said flat surface and by said concave surface, an injection valve means on said housing communicating with said first chamber having an actuating member protruding into said first chamber for injecting hydraulic fluid into said first chamber, means connected to said diaphragm for opening said valve on movement of said diaphragm beyond a fixed point in said first chamber into contact with said actuating member, a release valve means in said second chamber connected to said diaphragm for releasing hydraulic fluid from said first chamber to said second chamber on movement of said diaphragm beyond a fixed point in said second chamber, and means for supplying hydraulic fluid under pressure to said injection valve means including a conduit connected to said injection valve means and to a source of hydraulic fluid, said diaphragm being adapted to transmit pressure to fluid in said second chamber on reciprocal motion of said hydraulic fluid and said injection valve means supplying hydraulic fluid to said first chamber to compensate for hydraulic fluid lost from said first chamber.

References Cited in the file of this patent

UNITED STATES PATENTS

| | | |
|---|---|---|
| 900,357 | Davis | Oct. 6, 1908 |
| 1,782,144 | Jensen | Nov. 18, 1930 |
| 1,790,206 | Farmer | Jan. 27, 1931 |
| 1,927,587 | Hacker | Sept. 19, 1933 |
| 2,356,738 | Brugger | Aug. 29, 1944 |
| 2,506,434 | Quimper | May 2, 1950 |
| 2,543,585 | Miller | Feb. 27, 1951 |
| 2,563,257 | Loukomen | Aug. 7, 1951 |

FOREIGN PATENTS

| | | |
|---|---|---|
| 102,948 | Australia | Jan. 27, 1938 |